US006393330B1

United States Patent
Giraud et al.

(10) Patent No.: US 6,393,330 B1
(45) Date of Patent: May 21, 2002

(54) METHOD AND DEVICE FOR MANAGING AN ELECTRONIC COMPONENT WITH COMPLEMENTARY MOS TRANSISTORS FUNCTIONING UNDER RADIATION

(75) Inventors: Alain Giraud, Orsay; Francis Joffre, Banes-sur-Yvette, both of (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/242,063

(22) PCT Filed: Jun. 25, 1998

(86) PCT No.: PCT/FR98/01352

§ 371 Date: Mar. 17, 1999

§ 102(e) Date: Mar. 17, 1999

(87) PCT Pub. No.: WO99/00882

PCT Pub. Date: Jan. 7, 1999

(30) Foreign Application Priority Data

Jun. 26, 1997 (FR) .............................................. 97 08025

(51) Int. Cl.[7] .......................... G05B 9/02; H01H 36/00
(52) U.S. Cl. ........................................ 700/79; 307/126
(58) Field of Search ............................. 700/79, 81, 82; 307/126; 376/119, 215; 714/10; 324/501, 529, 530, 751–753

(56) References Cited

U.S. PATENT DOCUMENTS

| | | | | |
|---|---|---|---|---|
| 5,287,264 A | * | 2/1994 | Arita et al. ................... | 700/79 |
| 5,287,361 A | * | 2/1994 | Joffre .......................... | 714/10 |
| 5,535,082 A | * | 7/1996 | Botti et al. ................... | 361/18 |
| 5,672,918 A | * | 9/1997 | Kimbrough et al. ......... | 307/126 |

FOREIGN PATENT DOCUMENTS

| | | |
|---|---|---|
| EP | 0 461 982 | 12/1991 |
| EP | 0 461 982 A1 | 12/1991 |
| FR | 2 721 122 | 12/1995 |

OTHER PUBLICATIONS

Handbook of Radiation Effects by Andrew Holmes–Siedle/Lens Adams, Oxford Science Publications, pp. 110–113.

Giraud, A., et al., "Rad–hard embedded computers for nuclear robotics," RADECS 93. Second European Conference on Radiation and its Effects on Components and Systems, (Cat. No. 93TH0616-3), Proceedings of $2^{nd}$ European Conference Radiations and Their Effects on Devices and Systems (RADECS 93), St. Malo, France, Sep. 13–16, 1994, New York, NY, USA IEEE, USA, pp. 43–47. XP–002061045.

Pease, R. L., "Total–dose issues for microelectronics in space systems," IEEE Transactions on Nuclear Science, Apr. 1996, IEEE, USA, vol. 43, No. 2, Pt. 1, pp. 442–452. XP–002061046.

Shumake, D. P., et al., "Hardened CMOS/SOS LSI circuits for satellite applications," IEEE Annual Conference on Nuclear and Space Radiation Effects, Williamsburg, VA, USA, Jul. 12–15, 1997, vol. ns–24, No. 6, pp. 2177–2180. XP–002061047.

* cited by examiner

Primary Examiner—Paul P. Gordon
Assistant Examiner—Elliot Frank
(74) Attorney, Agent, or Firm—Burns, Doane, Swecker & Mathis LLP

(57) ABSTRACT

A method and device for managing the functioning under irradiation of an electronic component having a nominal supply voltage. During a test phase there is applied to the component an initial supply voltage less than the nominal voltage and the functioning of the component is checked. Next, during a working phase, the nominal supply voltage is applied to the component, and finally, during an off-load phase, an off-load voltage is applied to the component in order to determine whether the electronic component functions under irradiation.

20 Claims, 3 Drawing Sheets

METHOD AND DEVICE FOR MANAGING AN ELECTRONIC COMPONENT WITH COMPLEMENTARY MOS TRANSISTORS FUNCTIONING UNDER RADIATION

TECHNICAL FIELD

The present invention concerns a method for managing the functioning under irradiation of at least one electronic component with complementary MOS (metal-oxide-semiconductor) transistors. It also concerns a device powering such an electronic component in systems including one or more such devices.

Within the meaning of the present invention, electronic component with complementary MOS or CMOS transistors means not only individual elementary components such as gates or inverter gates including CMOS transistors, but also assemblies formed by a plurality of individual elementary components, such as circuits, parts of circuits, microprocessors or computers, including CMOS transistors.

The invention finds application in the manufacture of electronic devices, such as control devices, which can be used in a hostile atmosphere of ionising radiations, notably in the civil nuclear industry. The invention also finds application in the production of embedded electronic devices intended to be used in a hostile ionising radiation environment.

STATE OF THE PRIOR ART

The development of electronic systems used in the civil nuclear industry has increased considerably during the 1990s.

For reasons of cost, delivery times and legislation, these specific components designed to resist radiation have, to a great extent, been replaced by very widespread standard components, in particular by components of the CMOS type (components with transistors of the complementary metal-oxide-semiconductor type).

Thus, by selecting in advance components whose resistance to radiation is good and by complying with certain design rules for the architecture of the systems, these systems can be used with ionising radiation doses greater than 1 Mrad.

Studies currently being carried out even show that increasing the quality of the methods of manufacturing, the intrinsic resistance of the components improves very significantly. It nevertheless remains true that the versatility of the new components makes it difficult to control in advance the resistance to radiation. With the majority of embedded applications, it is important to react preventatively to the loss of functionality of an electronic system. A loss of functionality can in fact be the cause of a significant degradation of the components due to the assimilated radiation dose.

It is considered that a component is subject to a loss of functionality either when it has failed or when the execution of the tasks assigned to it are not error-free.

If the architecture of an electronic system is designed with a certain number of redundant elements or parts, it is possible to reconfigure the system in order to connect up new elements which were not powered and to disconnect elements which were powered. In this regard reference can be made, for example, to Rad-hard Embedded Computer for Nuclear Robotics by A. Giraud et al, Conference Proceedings RADECS 1993, pages 43–47.

Such a reconfiguration thus makes it possible to eliminate from the system, in a preventive, temporary or definitive fashion, the components which have failed or are liable to cause a failure.

The reconfiguration of an electronic system subjected to radiation, during which some components are powered down, makes it possible to avoid excessive degradation of the components and even to "regenerate" the latter. It is in fact known that the electronic components of microcontrollers and particularly components of the MOS (metaloxide-semiconductor) type, subjected to ionising radiation, but powered down, may recover, at least partly, their initial characteristics, after having being degraded when they were powered down.

The phenomenon of regeneration of powered-down components, in the presence of radiation, is due to a discharge of the charges caused by the radiation and by an effect of compensation and redistribution of the charges. In particular, in MOS components, the holes migrate towards the oxide-semiconductor interface region in order to compensate for the charges trapped in the oxide layer. In this regard reference can be made to French Patent Applications FR-A-2 721 122 and FR-A-2 633 160.

In order to envisage a reconfiguration of an electronic system and anticipate any failures of the components, it is necessary to establish a relationship between the ionising radiation dose received by the components and the functionality of the system.

In order to determine the radiation dose received by the components, it is known that a shifting of the threshold voltage of the CMOS components can be taken into account.

By way of example, a simple CMOS component, such as an inverter gate of the 7404 type, can be used as a dosimeter. An inverter gate of the 7407 type is composed of a pair of NMOS and PMOS transistors. For a given supply voltage +Vcc for the component, the switching threshold of the inverter gate is around Vcc/2. When the component is subjected to radiation, this threshold decreases. Depending on the biasing conditions during the irradiation (high biasing) the threshold can even become negative.

It appears that, under nil biasing, during the irradiation of the component, the threshold voltage of the inverter gate is a relatively homogeneous function of the dose received.

Associated with an electronic system, an inverter gate of the 7404 type with MOS components can thus serve to measure the radiation dose received. In this regard reference can be made to the document Handbook of Radiation Effects, by Andrew Holmes-Siedle/Lens Adams, Oxford Science Publications, pages 110–113.

Another useful parameter for measuring the irradiation is the consumption current of the complementary MOS (CMOS) components. The consumption current of a CMOS component increases with the radiation dose received. This is a consequence of the threshold voltage of 0 volts of the NMOS (n-type MOS) transistors being exceeded. The leakage current of the transistors increases in fact when the threshold voltage is negative. Thus, in certain devices, the measurement of the quiescent current is used to monitor the ionising radiation dose received. In this regard reference can be made to Total-Dose Issues for Microelectronics in Space Systems, by Ronald L. Pease, IEEE Transactions on Nuclear Science, Vol. 43, No. 2, April 1996, pages 442–450.

It appears, however, that the use of the parameter of the current consumed by a component does not well represent the availability of the component or of the electronic system on which this current is measured. This is because the intensity of the current remains sensitive to the dose rate and does not show the influence of a regeneration of the component. It is normal to observe a rapid increase in the consumed current followed by a slower decrease, without the availability of the component or components being effected thereby. Moreover, the electronic components subjected to radiation are usually able to function beyond the characteristics supplied by the manufacture of these components.

The devices or methods for determining the irradiation doses described above certainly make it possible to indicate that predetermined critical thresholds have been exceeded but do not guarantee the functioning of an electronic system for a given task to be accomplished in a given length of time.

Thus, in order to increase the reliability of the functioning of an electronic system, this system is generally oversized. Such a measure, however, has negative consequences on the cost of the system, its complexity and its bulk.

In addition, the means described above do not take account of the phenomenon of regeneration of the components, already mentioned.

DISCLOSURE OF THE INVENTION

The aim of the invention is to propose a method and device for managing the functioning of electronic components which do not have the limitations set out above.

One aim of the invention is in fact to guarantee the functioning of a component or of a plurality of electronic components for a given length of time, taking account of the ionising radiation received by the components during this time.

Another aim of the invention is to take into account the ability of the components to regenerate themselves when they are not powered up.

To achieve these aims the object of the invention is more precisely a method of managing the functioning under irradiation of at least one electronic component having a nominal supply voltage $V_{nom}$, in which:

during a so-called test phase, there is applied to the component an initial supply voltage $V_{init}$ less than the nominal voltage $V_{nom}$ and greater than or equal to a minimum operating voltage $V_{min}$ and a check is carried out on the functioning of the component, and during a so-called working phase, initiated when the check has revealed correct functioning of the component, there is applied to the component a working supply voltage $V_{supp}$ greater than the initial supply voltage $V_{init}$.

The invention applies in particular to components comprising one or more stages of complementary transistors of the MOS (metal-oxide-semiconductor) type.

The method can also include a so-called off-load phase, initiated either when the working phase is terminated or when the check has revealed defective functioning. During this phase, an off-load voltage is applied to the component.

Within the meaning of the invention, nominal supply voltage means the voltage at which the component should normally be supplied for its functioning in a device in which it is integrated.

In addition, the minimum operating voltage is defined as the lowest supply voltage necessary to the component to execute a task without loss of functionality.

The invention is based on the finding that the correct functioning of an irradiated electronic component can be ensured by applying a higher supply voltage to it.

In other words, an increase $\Delta V$ in the supply voltage makes it possible to maintain the correct functioning of a component for a given irradiation dose assimilated by the component during a working phase. Thus, by measuring the ionising radiation dose assimilated by the component it is possible to determine a period of functioning or working phase period during which the correct functioning of the component, whose supply voltage is increased by $\Delta V$, can be maintained.

By virtue of the method of the invention, if the correct functioning of the component is verified for the initial voltage $V_{init}$, functioning during the working phase at a voltage greater than the initial voltage by at least $\Delta V$, can be maintained.

In particular, the component can be supplied during the working phase with a supply voltage substantially equal to its nominal voltage.

In this case, the initial voltage at which the test is carried out is such that $V_{init}=V_{nom}-\Delta V$.

In order to guarantee functioning under radiation for a given period, the period of the working phase can be adjusted as a function of the increase in the supply voltage $\Delta V$ due to the radiation.

For a given dose assimilated by a component, the supply voltage of this component has a minimum operating value denoted $V_{min}$.

Thus, according to a particular aspect of the invention, it is possible to determine, for each electronic component, the minimum operating voltage under irradiation $V_{min}$ and the duration of the working phase with respect to the duration of the off-load phase is adjusted as a function of the said minimum operating voltage.

More precisely, it is also possible to adjust the duration of the working phase and of the off-load phase as a function of a difference between the nominal voltage and the minimum voltage.

These measurements make it possible to obtain an optimum functioning of the component or components by taking into account their ability to be regenerated during the off-load phase when an off-load voltage, preferably zero, is applied to them. In addition, in order to perfectly take account of the regeneration of the components, it is possible to determine the minimum operating voltage during or just after the off-load phase.

According to another aspect of the invention, a method is defined in which:

a minimum operating voltage $V_{min}$ of the component under irradiation is determined, then the component is supplied at a supply voltage $V_{supp}$ such that $V_{min}+\Delta V \leq V_{supp} \leq V_{nom}$, during a working phase whose duration is determined according to $\Delta V$, $\Delta V$ being a voltage, and then an off-load voltage is applied to the component during an off-load phase.

Thus, as the supply voltage is greater than the minimum operating voltage by a quantity at least equal to $\Delta V$, the component can assimilate an irradiation dose, a function of $\Delta V$, without losing its functionality. The link between the voltage difference $\Delta V$ and the permissible irradiation dose can be established experimentally.

Another object of the invention is a supply control device for at least one electronic component including:

means of controlling the functioning the electronic component, a nominal supply voltage source, an off-load voltage source, a so-called initial voltage source, less than the nominal voltage, and selection means controlled by the control means in order to selectively apply to the component:
the initial voltage during a control phase,
the nominal supply voltage during a working phase when the functioning of the component is correct during the control phase,
the off-load voltage during an off-load phase, when the functioning of the electronic component is defective during the control phase.

The selection means are for example an electronic gate with three inputs connected respectively to the nominal voltage source, to the off-load voltage source and to the initial voltage source.

The means of controlling the correct functioning of the component can be test circuits able to carry out tests such as, for example, "life" tests, "coherence" tests or "autotests". The control means can thus include circuits of the "watchdog" type.

Circuits of the "watchdog" type are generally provided for components such as a microprocessor. The microprocessor must regularly apply to the "watchdog" circuit a sign-of-life pulse which constitutes a check on its correct functioning.

The invention also concerns a computer comprising a plurality of redundant calculation units able to function in turn. In accordance with the invention, each calculation unit is equipped with a supply control device as described above.

In particular, each calculation unit can be a microcontroller.

In order to control the functioning of the calculation units in turn, such a microcontroller can be programmed so as to control, when a working phase is completed, the energising of another calculation unit.

More precisely, each calculation unit can be programmed to:

a) select a following calculation unit when a working phase is completed, b) control the control means of the supply control device of the said following calculation unit in order to initiate a control phase and a working phase if the check reveals correct functioning, c) select another following calculation unit if the check reveals defective functioning.

As a variant of the system described above, the invention also concerns an electronic system including a plurality of the calculation units and an electronic monitoring module for the functioning of the calculation units in turn. In this system, the monitoring module has at least one supply control device as described above, associated with the plurality of calculation units.

Another object of the invention is a method of testing a component comprising at least one transistor of the CMOS type, in which:

the component is caused to function whilst decreasing the supply voltage for the component until a defective functioning of the component is detected, a reading is taken of the supply voltage ($V_{min}$) of the component below which defective functioning occurs, and this supply voltage is compared with a nominal supply voltage ($V_{nom}$) for the component in order to establish an operating margin of tolerance for the component under irradiation.

The operating margin of tolerance can be understood, for example, as the difference between the nominal voltage and the voltage below which effective functioning is observed. The operating margin of tolerance thus constitutes an item of information on the quality of the component, which expresses its suitability for functioning in an irradiated environment.

Other characteristics and advantages of the invention will emerge more clearly from the description which follows, with reference to the figures in the accompanying drawings, given purely for illustration and non-limitatively.

DETAILED DESCRIPTION OF EMBODIMENTS OF THE INVENTION

Before the description proper of devices according to the invention, it is necessary to indicate the functioning of an experimental device for measuring the minimum operating voltage $V_{min}$ of a component. This voltage in fact constitutes a useful parameter for implementing the invention.

Figure 1:
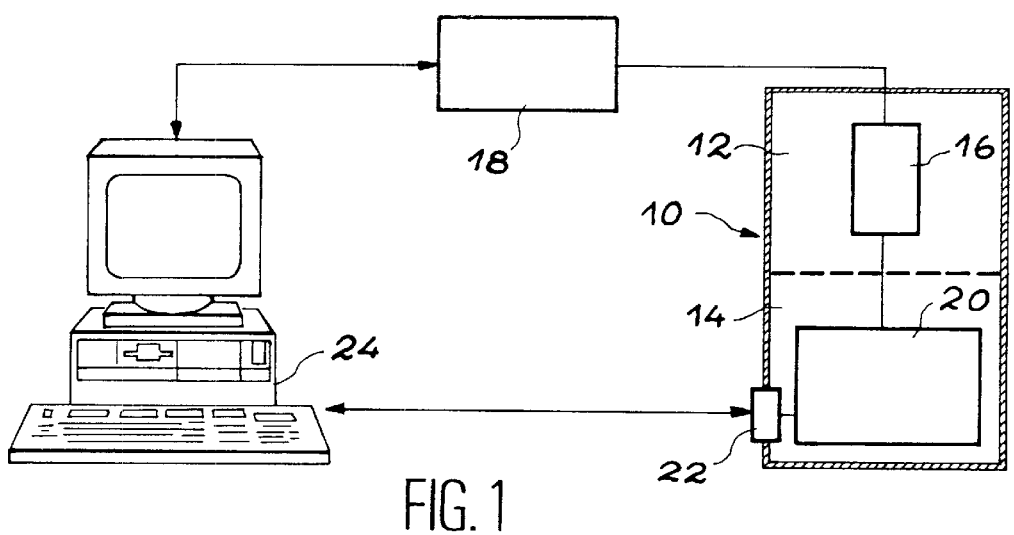
FIG. 1 is a simplified diagram illustrating an experimental device for measuring the minimum operating voltage of an electronic component in an irradiated area.

To this end, FIG. 1 gives an example of a device for automatically measuring the minimum voltage.

The device has a measurement field 10 with an irradiation area 12 and a so-called protected area 14 in which the irradiation is negligible.

A component 16, for example a printed circuit board or a microprocessor, whose minimum operating voltage it is wished to know, is disposed in the irradiation area 12 in order to be subjected to a given ionising radiation.

The component 16 is connected on the one hand to a controlled supply device 18, disposed outside the measuring field 10, and on the other hand to a logic electronic system 20 for controlling its correct functioning. The logic control system 20 is disposed in the protected areas 14 in order not to be subjected to irradiation. It is intended to effect a certain number of tests for checking the functionality of the component which is connected thereto.

Moreover, the logic control system 20 is equipped with dialogue software and an information exchange port 22 by means of which it is connected to a control unit such as a personal microcomputer 24.

The personal microcomputer is also connected to the controlled supply device 18 in order to control and vary the supply voltage applied to the component 16.

According to a first experimental protocol, the irradiated component 16 functions continuously and dialogues with the logic control unit 20, which checks its correct functioning. A nominal voltage of 5 volts is first of all applied to the component 16. Then, approximately every ten minutes, the supply device is controlled in order to determine the minimum operating voltage. In practice, the voltage supplied to the component 16 is decreased in steps of 0.1 volts until a loss of functionality is detected by the logic control system 20.

The loss of functionality is expressed by the fact that the tests carried out by the logic control system 20 prove negative or more simply by the loss of communication between the microcomputer 24 and the logic control system 20.

Figure 2:
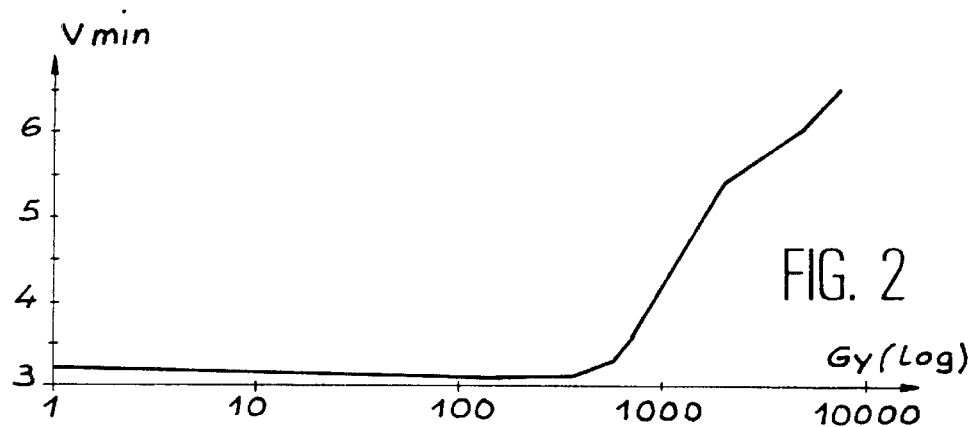
FIG. 2 is a diagram showing a relationship between a minimum operating voltage of a component supplied continuously, as a function of an irradiation dose received by this component.

FIG. 2 depicts, in graph form, the change in the minimum operating voltage of a microprocessor of the OKI 80 C86 type, measured as described above.

In order to establish the measurements depicted in FIG. 2, the component was subjected to an irradiation of 100 Gy/h.

Finally, it should be noted that, in FIG. 2, the radiation dose received by the component is entered on the X-axis, on a logarithmic scale and expressed in grays, whilst the minimum operating voltage is indicated on the Y-axis and expressed in volts.

An analysis of FIG. 2 shows clearly an increase in the minimum operating voltage over time, as a function of the increase in the irradiation dose assimilated by the component.

When another series of experimental measurements were made, microcontrollers of the 68EMO5C4EC type were subjected to an irradiation of 60 Gy/h.

However, the microcontrollers were not powered during the irradiation and the measurements of the minimum operating voltage were carried out for stepped doses by removing the microcontrollers from the irradiation area.

Figure 3:
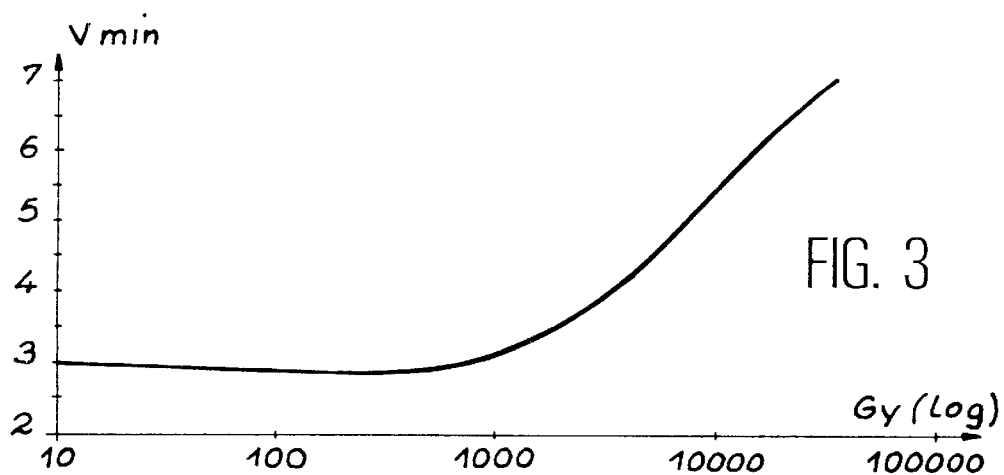
FIG. 3 is a diagram showing a relationship between the minimum operating voltage of a set of identical electronic components as a function of an irradiation dose received by these components, the components remaining non-powered during the irradiation and being put under irradiation again after the measurement of the minimum operating voltage.

The results of measurements of minimum voltage are indicated by the curve in FIG. 3.

In FIG. 3 the dose received by a microcontroller is entered on the X-axis and expressed in grays whilst the minimum operating voltage in volts is indicated on the Y-axis.

It may also be noted, by examining FIG. 3, that the minimum operating voltage increases with the irradiation dose assimilated by the component.

The fact that the components are not powered during the irradiation enables them to be under the most favourable conditions, and thus to withstand higher irradiation doses. Such a study makes it possible to effect a first selection of the components for their irradiation resistance.

Figure 4:
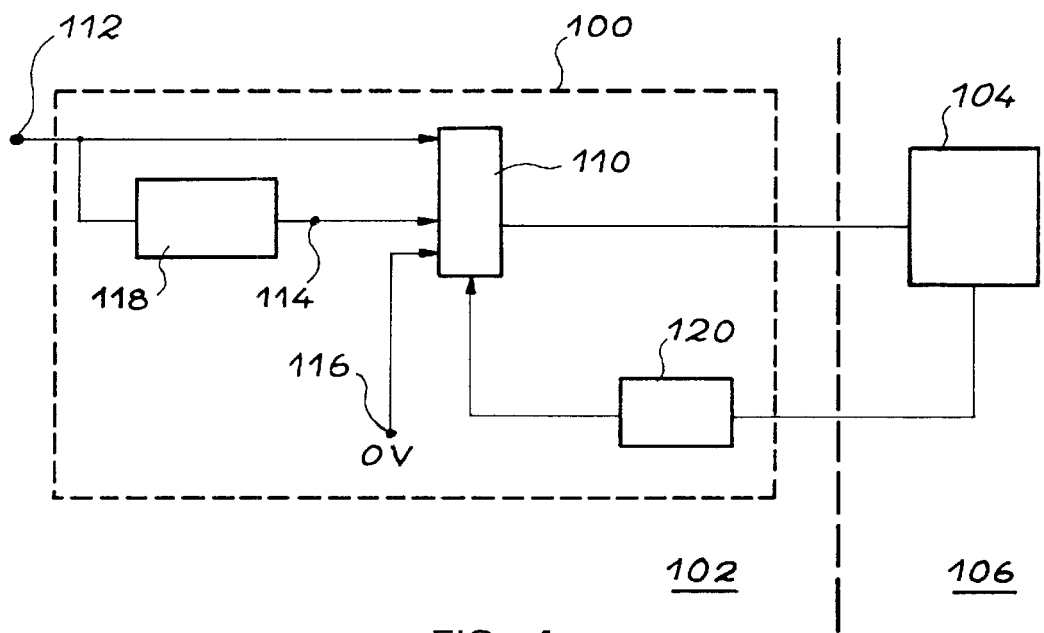
FIG. 4 is a simplified schematic representation of a supply control device according to the invention.

FIG. 4 depicts schematically a supply control device according to the invention.

The supply control device is indicated with the general reference 100. It is connected to an electronic component 104, disposed generally in a irradiated area 106, in order to supply it with electrical energy.

The device 100 has a selection circuit 110 with switches, enabling the electronic component 104 to be connected selectively to a nominal voltage source 112, a so-called initial voltage source 114 and to an off-load voltage source 116.

The initial voltage source is supplied by a voltage-reducing circuit 118 connected to the nominal voltage source 112.

Finally, the off-load voltage source can simply be a terminal connected to earth. Its voltage is then 0 volts.

The selection circuit 110 enables the circuit 104 to be operated according to three operating phases, each characterised by a voltage applied to the circuit 104.

The first phase is a so-called working phase during which the component 104 is connected to the nominal voltage and functions normally. The duration of this phase is fixed by the control device 120, preferably according to a voltage difference between the nominal voltage and the initial voltage and as a function of the intensity of the radiation through which the component is subjected. In such a case, the control device 120 can also be equipped with a dosimeter, if the irradiation is not known. This component is however not essential and is not depicted in the figure.

Another phase is the off-load phase during which the component is not under voltage or is at a low voltage. In this phase, the component can be regenerated.

The off-load phase is maintained for a period depending for example on the duration of the working phase, the irradiation dose of the component and the difference between the nominal voltage and the minimum operating voltage. The off-load phase can also be maintained as long as the component is malfunctioning.

Finally, during a test phase, an initial voltage $V_{init}$, less than the nominal voltage, is applied to the circuit and the correct functioning of the component is checked.

To this end, the supply control device 100 is equipped with means 120 of checking the functioning, connected to the component 104.

As indicated previously, these means 120 can be equipped with circuits of the "life tester" or "watchdog" type, known per se.

The control means 120 are also connected to the selection circuit 110 in order to control it and notably to inhibit the working phase if correct functioning of the component is not verified.

As a secondary feature, it may be noted that the control means 120 used conjointly with an adjustable voltage reducer 118 can also be used to determine the minimum operating voltage of the component 104. It suffices in fact, during the test phase, to continue to reduce the voltage below the initial voltage $V_{init}$ until a loss of functionality is actually detected.

Figure 5:
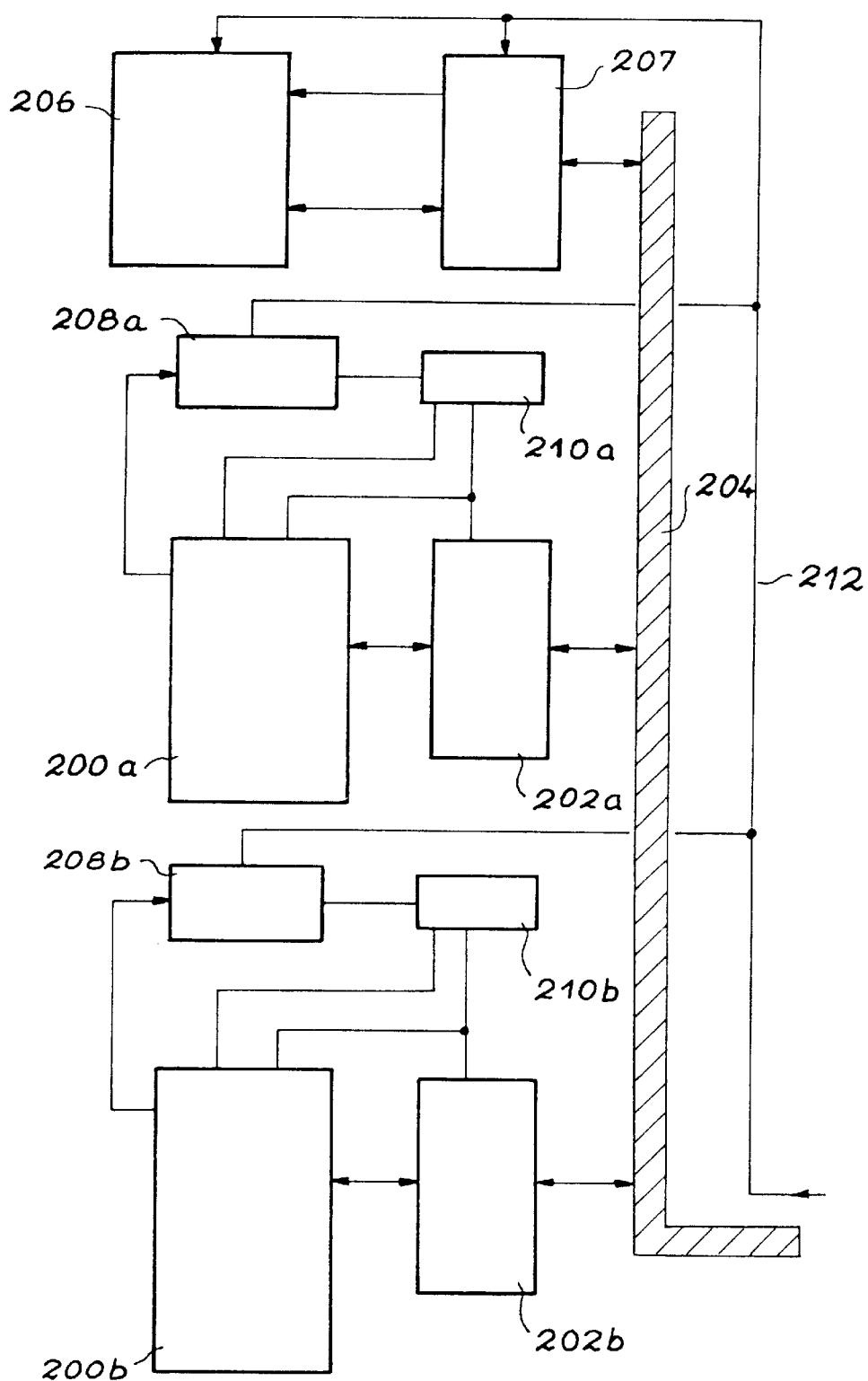
FIG. 5 is a simplified schematic representation of an electronic computer equipped with supply control devices according to the invention.

FIG. 5 shows an example of use of the device according to FIG. 4.

FIG. 5 depicts schematically and partially a computer equipped with a plurality of identical calculation units 200a and 200b, only two of which are depicted.

Each calculation unit is equipped with a programmable memory of the PROM (programmable read only memory) type and a microcontroller.

Each calculation unit is connected to an information input and output interface 202a, 202b for transmitting and receiving data conveyed over an input and output bus 204.

The bus 204 enables information to be exchanged with peripheral equipment or with a central memory 206 also provided with an input and output interface 207.

It should also be noted that each calculation unit is equipped with an electronic monitoring circuit of the "watchdog" type 208a, 208b and a control unit 210a, 210b.

The electronic monitoring circuit 208a, 208b is respectively connected to the corresponding calculation unit 200a, 200b, which for its part must continuously communicate signals characteristic of its functioning. In this application, the monitoring circuits 208a, 208b fulfil substantially the role of the control means 120 (FIG. 4) described above.

In the same way, the control unit 210a and 210b associated with each calculation unit fulfils substantially the role of the selection circuit 110 of FIG. 4.

The control unit 210a, 210b is controlled not only by the corresponding monitoring circuit 208a and 208b, which checks the correct functioning of the associated calculation unit, but also by the calculation unit itself, which can control its de-energising.

It should finally be noted that the calculation units are respectively supplied by means of the control units and monitoring circuits, connected to a common supply line 212.

Finally, the control unit and monitoring circuit associated with each microcontroller conjointly form a supply control device as depicted in FIG. 4.

In order to explain the functioning of the computer of FIG. 5, it will be considered that, initially, the first microcontroller of the first calculation unit 200a is in operation whilst the microcontrollers of the other calculation units are idle.

In this case, the first microcontroller manages the functioning of the computer. When its working phase is terminated, it "wakes up" a second microcontroller. The second microcontroller is then powered with an initial supply voltage lower than the nominal supply voltage and is subjected to one or more control tests in association with the control circuit 208b in order to check its functionality.

If correct functioning is verified, the second microcontroller is then powered at its nominal voltage. A transfer of the working data takes place between the microcontrollers. Then the second microcontroller begins a working phase, whilst the first microcontroller returns to an idle phase in which it is not powered.

If on the other hand correct functioning of the second microcontroller is not verified, the latter remains in the idle phase and the first microcontroller "wakes up" another microcontroller.

Such a functioning makes it possible, having regard to the ability of the components to regenerate themselves when they are powered down, to increase the availability of the computers.

Figure 6:
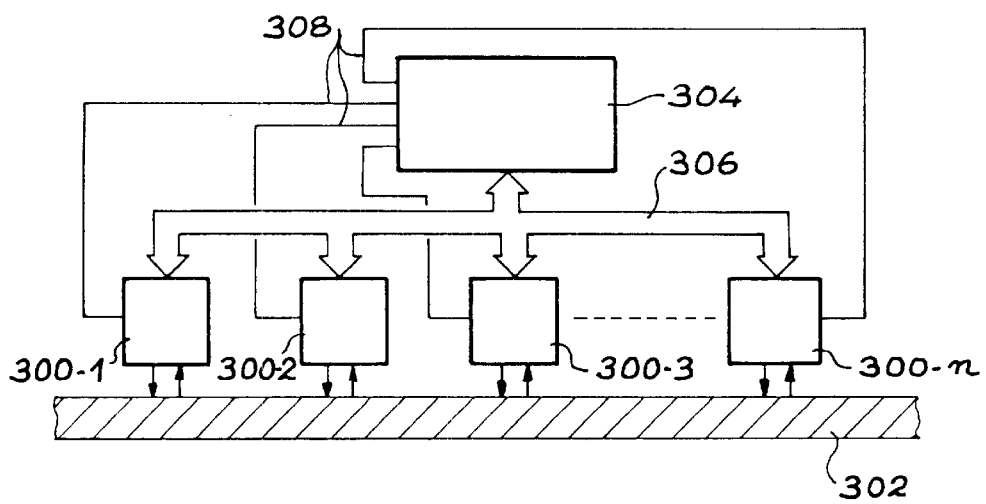
FIG. 6 is an electronic system of calculation units equipped with a supply control device according to the invention.

FIG. 6 shows another electronic system equipped with calculation units and a supply control device according to the invention.

The system of FIG. 6 includes a plurality of calculation units referenced 300-1, . . . , 300-n. All the calculation units are connected to an information input and output bus 302.

The system also includes an electronic monitoring module 304 functioning in accordance with the invention and providing the successive powering up of one or more calculation units in turn.

A control bus 306 connects the monitoring module to the calculation units. By means of the bus 306, the monitoring module effects, in corresponding test phases, checks on the functionality of the calculation units.

During the test phases an initial voltage $V_{init}$ is applied to the calculation units as described above.

The monitoring module 304 is also designed to measure and store the minimum operating voltage of each calculation unit which is connected thereto. The monitoring module 304 is electrically connected to each calculation unit 300-1, . . . , 300-n by electrical links 308 in order to apply thereto a controlled supply voltage in accordance with the invention.

Finally, the module 304 is programmed to individually adjust, for each calculation unit 300-1, . . . , 300-n, a ratio of the duration of the working phase to the duration of the idle phase as a function of a voltage difference between the nominal supply voltage and the minimum supply voltage of this calculation unit.

What is claimed is:

1. A method of managing the functioning under irradiation of at least one electronic component having at least one stage of complementary MOS transistors and having a nominal supply voltage $V_{nom}$, the method comprising the steps of:

a) applying to the component during a test phase an initial voltage $V_{init}$ less than the nominal voltage $V_{nom}$ and greater than or equal to a minimum operating voltage $V_{min}$;

b) checking to verify that the component is functioning; and c) applying to the component during a working phase, a working supply voltage $V_{supp}$ greater than the initial supply voltage when the component is functioning in step (b) in order to manage the component under irradiation.

2. The method according to claim 1 further comprising the step of applying an off-load voltage to the component when either the working phase is terminated or when step (b) determines the component is not functioning.

3. The method of claim 1 wherein the working supply voltage $V_{supp}$ is substantially equal to the nominal voltage $V_{nom}$.

4. The method of claim 3 further comprising the step of determining a voltage difference $\Delta V$ for maintaining correct functioning of the component for a given irradiation dose, and the initial voltage $V_{init}$ is established according to the following formula:

$$V_{init} = V_{nom} - \Delta V.$$

5. The method of claim 4 wherein the working phase has a given duration as a function of the voltage difference $\Delta V$.

6. The method of claim 1 further comprising the steps of determining the minimum operating voltage under irradiation $V_{min}$ and adjusting a ratio of the duration of the working phase compared with the duration of an off-load phase as a function of the minimum operating voltage $V_{min}$.

7. The method of claim 6 further comprising the step of adjusting the duration of the working phase and the off-load phase as a function of a difference between the nominal voltage $V_{nom}$ and the minimum operating voltage.

8. The method of claim 6 wherein the minimum operating voltage $V_{min}$ is determined during the off-load phase.

9. The method of claim 1 wherein an off-load voltage is a zero voltage or a low voltage.

10. A method of managing the functioning under irradiation of at least one electronic component comprising at least one stage of complementary MOS transistors having a nominal supply voltage $V_{nom}$, the method comprising the steps:

a) determining by a test, a minimum operating voltage $V_{min}$ of the component under irraditation;

b) providing a supply voltage $V_{supp}$ to the component such that $V_{min} + \Delta V \leq V_{supp} \leq V_{nom}$, during a working phase with a duration according to the voltage $\Delta V$; and c) applying an off-load voltage to the electronic component during an off-load phase.

11. A supply control device for at least on e electronic component having at least one stage of complementary MOS transistors, the device comprising:

means for controlling the functioning of the electronic component;

a nominal supply voltage source;

an off-load voltage source;

an initial voltage source that is less than the nominal voltage; and selection means controlled by the control means in order to selectively apply to the component the initial voltage during a control phase, the nominal supply voltage during a working phase when the function of the component is correct during the control phase, and the off-load voltage during an off-load phase when the functioning of the electronic component is defective during the control phase.

12. The device of claim 11 in which the control means include at least one circuit of a "watchdog" type.

13. The device of claim 11 in which the initial voltage source includes a voltage reducer connected to the nominal voltage source.

14. A computer comprising a plurality of redundant calculation units able to function characterised in that each calculation unit has a supply control device for at least one electronic component with at least one stage of complementary MOS transistors, the supply control device having:

means for controlling the functioning of the electronic component;

a nominal supply voltage source;

an off-load voltage source;

an initial voltage source that is less than the nominal voltage; and selection means controlled by the control means in order to selectively apply to the component the initial voltage during a control phase, the nominal supply voltage during a working phase when the function of the component is correct during the control phase, and the off-load voltage during an off-load phase when the functioning of the electronic component is defective during the control phase.

15. The computer of claim 14 in which each calculation unit includes a microcontroller able to control the powering up of another calculation unit when the working phase is completed.

16. The computer of claim 14, in which each calculation unit is configured to:

a) select a following calculation unit when the working phase is completed;

b) control the control means of the supply control device of the following calculation unit in order to initiate the control phase and the working phase if a check reveals correct functioning;

c) select another following calculation unit if the check reveals defective functioning.

17. An electronic system including a plurality of calculation units and an electronic supervision module for the functioning of the calculation units, in which the supervision module has at least one supply control device for at least one electronic component with at least one stage of complementary MOS transistors, the supply control device having:

means for controlling the functioning of the electronic component;

a nominal supply voltage source;

an off-load voltage source;

an initial voltage source that is less than the nominal voltage; and selection means controlled by the control means in order to selectively apply to the component the initial voltage during a control phase, the nominal supply voltage during a working phase when the function of the component is correct during the control phase, and the off-load voltage during an off-load phase when the functioning of the electronic component is defective during the control phase.

18. The system of claim 17 in which each calculation unit is connected to the supervision module by a data exchange bus in order to control its correct functioning and by an electrical link for its electrical supply.

19. The system of claim 18 in which the supervision module includes means for determining a minimum voltage of each calculation unit and is able to adjust a ratio of the duration of the working phase to the duration of the off-load phase of each calculation unit as a function of the minimum operating voltage of the unit.

20. A method of testing a component under irradiation comprising at least one stage of complementary MOS transistors, the method comprising the steps of:

a) decreasing a supply voltage of the component until a defective functioning of the component is detected;

b) reading a supply voltage $V_{min}$ of the component below which defective functioning occurs; and c) comparing the supply voltage $V_{min}$ with a nominal supply voltage $V_{nom}$ for the component in order to establish an operating margin of tolerance for the component under irradiation.

* * * * *